United States Patent [19]
Nellums

[11] Patent Number: 5,560,249
[45] Date of Patent: Oct. 1, 1996

[54] POWER SYNCHRONIZER FOR A COMPOUND TRANSMISSION

[75] Inventor: Richard A. Nellums, Farmington Hills, Mich.

[73] Assignee: Eaton Corporation, Cleveland, Ohio

[21] Appl. No.: 412,721

[22] Filed: Mar. 29, 1995

[30] Foreign Application Priority Data

May 5, 1994 [GB] United Kingdom .................. 9408923

[51] Int. Cl.$^6$ ..................................................... F16H 3/12
[52] U.S. Cl. ................................................ 74/339; 477/3
[58] Field of Search ........................... 74/665 A, 665 B, 74/339; 477/2, 3

[56] References Cited

U.S. PATENT DOCUMENTS

| | | |
|---|---|---|
| 3,478,851 | 11/1969 | Smyth et al. . |
| 3,478,852 | 11/1969 | Smyth et al. ............................ 192/3.5 |
| 3,808,738 | 5/1974 | Siebers et al. ............................ 74/339 |
| 3,946,842 | 3/1976 | Siebers et al. ............................ 192/3.58 |
| 4,023,443 | 5/1977 | Usui et al. . |
| 4,081,065 | 3/1978 | Smyth et al. . |
| 4,140,031 | 2/1979 | Sibeud et al. . |
| 4,361,060 | 11/1982 | Smyth . |
| 4,614,126 | 9/1986 | Edelen et al. . |
| 4,648,290 | 3/1987 | Dunkley et al. . |
| 4,785,917 | 11/1988 | Tateno et al. . |
| 5,053,961 | 10/1991 | Genise . |
| 5,053,962 | 10/1991 | Genise . |
| 5,099,711 | 3/1992 | Langbo et al. . |
| 5,136,897 | 8/1992 | Boardman ................................ 74/857 |

FOREIGN PATENT DOCUMENTS

| | | |
|---|---|---|
| 348622 | 1/1990 | European Pat. Off. . |
| 1930046 | 2/1971 | Germany . |
| 3417504 | 11/1985 | Germany . |
| 1435517 | 5/1976 | United Kingdom . |
| 8603269 | 6/1986 | WIPO . |

OTHER PUBLICATIONS

SAE Technical Paper 932999, "The Eaton® Ceemat™ Ate Transmission" by J. Scott Steurer and Robert W. Langbo.

*Primary Examiner*—Dirk Wright
*Attorney, Agent, or Firm*—Brooks & Kushman P.C.

[57] ABSTRACT

An apparatus for controlling the rotational speed of an input shaft of a motor vehicle transmission such as a compound heavy duty transmission to achieve synchronous during a ratio change includes a variable speed motor having a motor shaft operably engaged with an input shaft of the transmission, preferably through an intermediate gear and a countershaft gear. The motor may be an electric, hydraulic, or pneumatic motor, having a speed variable between zero and a maximum so that the input shaft speed can be decreased during upshifts, or increased during downshifts. In an alternative embodiment, the motor is operably engaged with the input shaft and with the output shaft.

18 Claims, 4 Drawing Sheets

POWER SYNCHRONIZER FOR A COMPOUND TRANSMISSION

TECHNICAL FIELD

This invention relates to power synchronization assemblies for change gear mechanical compound transmissions

BACKGROUND ART

Manually shifted, non-synchronized, nonblocked, mechanical, constant mesh change gear transmissions, usually for driving a land vehicle from a prime mover such as an Otto cycle or diesel engine, are well known in the prior art. Examples of such transmissions may be seen by reference to U.S. Pat. Nos. 3,105,395; 3,138,965; 3,283,613 and 3,611,823, the disclosures of which are hereby incorporated by reference in their entirety. This type of transmission utilizes selectively engageable positive or jaw clutches. Positive clutches of this type are relatively compact and inexpensive as compared to friction clutches, synchronized clutches and/or blocked clutches and are very reliable if utilized in connection with some type of synchronizing means.

Conventional, individually synchronized and/or blocked positive clutch structures are well known in the prior art as may be seen by reference to U.S. Pat. Nos. 3,221,851; 3,929,029; 4,307,624; 4,497,396; 3,799,002; 4,428,469 and 4,132,122, the disclosures of which are hereby incorporated by reference in their entirety. Conventional individual synchronizing devices, while providing easy shifting of gears in a transmission, require a relatively large space in the transmission housing and, due to the relatively limited space available within a transmission housing, are of a relatively limited capacity and/or life. This is especially true for transmissions utilized with heavy duty vehicles wherein the torque transfer capacities and inertias involved are relatively large. Individual blocked positive clutch assemblies, while providing relatively easy shifting of the transmission, do require a certain degree of skill to cause a crossing of synchronization and further are more complicated and space consuming than a conventional nonsynchronized nonblocked jaw clutch assembly.

Synchronizing of conventional nonsynchronized, nonblocked jaw clutch assemblies by operator manipulation of engine speed and "double clutching," is a highly efficient, well known and widely used transmission shifting method. However, such manual synchronizing of a mechanical transmission requires a high degree of operator skill, effort and attention.

Automatic mechanical transmission systems wherein electronic central processing units are utilized to automatically cause synchronization of positive jaw clutches by automatic manipulation of engine speed and the vehicle master clutch are also known in the prior art as may be seen by reference to U.S. Pat. No. 4,361,060, the disclosure of which is hereby incorporated by reference in its entirety. Such control systems require rather complicated engine and master clutch controls and further, when synchronizing the jaw clutches for a downshift, are limited by the engine governed speed, acceleration, and response times as to speed, acceleration and response time of the transmission input shaft driven jaw clutch members.

Automatic mechanical transmission systems utilizing power synchronizer devices, i.e. devices independent of engine speed, to provide input shaft braking and acceleration, and not manipulation of engine speed, to synchronize the transmission jaw clutch members, are known in the prior art. Examples of such systems may be seen be reference to U.S. Pat. Nos. 3,478,851; 4,023,443; 4,140,031 and 4,614,126, the disclosures of which are hereby incorporated by reference in their entirety.

Automatic mechanical transmission systems having a power synchronizer and also having a torque converter drivingly interposed between a drive engine and the transmission input shaft, and including a torque converter lock-up/disconnect clutch assembly, are known. Examples of such systems may be seen by reference to U.S. Pat. Nos. 4,784,019; 4,860,861; 5,099,711; 5,136,897 and S.A.E. Paper No. 881830 entitled "THE EATON CEEMAT (CONVERTER ENHANCED ELECTRONICALLY MANAGED AUTOMATIC TRANSMISSION)," the disclosures of which are hereby incorporated by reference in their entirety.

Such transmission systems provide an automatic mechanical transmission system utilizing a mechanical change gear transmission having a structure substantially identical to the structure of transmissions intended for manual usage, providing the advantages of a torque converter for vehicle start-ups, the advantages of nonslipping connection between the engine and transmission at higher vehicle speeds/gear ratios, and providing relatively rapid synchronization of the transmission positive jaw clutches. By providing an automatic mechanical transmission system based upon substantially the same mechanical change gear transmission utilized for manual transmission systems, manufacturing inventory and maintenance cost savings are obtained. If necessary, shifting mechanisms suitable for automatic control by solenoids or the like may be added to the transmission. An example of such a shifting mechanism may be seen by reference to above-mentioned U.S. Pat. Nos. 4,361,060 and 4,899,607 and U.S. Pat. Nos. 4,873,881; 4,722,237 and 4,445,393, the disclosures of which are hereby incorporated by reference in their entirety. A power synchronizer mechanism as disclosed in above-mentioned U.S. Pat. Nos. 4,614,126; 3,478,851 or 4,023,443 may also be added for synchronizing the transmission positive jaw clutches.

A torque converter is drivingly interposed between the drive engine and transmission. A torque converter and lock-up clutch structure is provided comprising first and second separate independently operable clutches, for coupling the torque converter driven member or turbine to the transmission input shaft and for coupling the torque converter input or impeller (i.e. the engine output) to the torque converter driven member or turbine, respectively. Preferably, the first and second clutches comprise frictional clutches.

The torque converter is drivingly interconnected between the engine and transmission only when the first coupling is engaged and the second disengaged. The torque converter is locked-up, i.e. the turbine driven directly by the engine, when the second clutch is engaged. The transmission is driven directly from the engine whenever the second clutch is engaged simultaneously with the first clutch.

When the first coupling is disengaged, regardless of condition of the second coupling, the transmission input shaft is disconnected from the engine torque, the inertia of the torque converter, and from the inertia of the second coupling. This allows the jaw clutches to be easily disengaged while allowing the power synchronizer mechanism to act quickly (due to relatively low inertia on the input shaft), and also allowing a selected gear to be pre-engaged with the vehicle at rest and in the drive condition.

Electronic and other engine fuel control systems wherein the fuel supplied to the engine may be modulated to provide a desired engine speed, regardless of the operator's setting of the throttle pedal, are known in the prior art. Such systems may be seen by reference to above-mentioned U.S. Pat. Nos. 4,081,065; 4,361,060 and 4,792,901 and by reference to various electronic engine control standards, such as SAE J1922, SAE J1939 and ISO 11898 (which is generally similar to and compatible with SAE J1939), the disclosures of which are hereby incorporated by reference in their entirety. Other related standards include SAE J1708, J1587 and J1843, all of which are hereby incorporated by reference in their entirety.

SUMMARY OF THE INVENTION

The present invention is an apparatus for controlling the rotational speed of an input shaft of a motor vehicle transmission which includes a mainshaft having a plurality of ratio gears selectively engageable thereto and at least one countershaft. The apparatus comprises a variable speed motor having a motor shaft operably engaged with the input shaft to selectively increase or decrease the rotational speed of the input shaft. In another embodiment of the invention, the apparatus comprises a variable speed motor operably engaged with the input shaft and with the mainshaft to selectively increase or decrease the rotational speed of the input shaft.

Accordingly, it is an object of the present invention to provide an improved power synchronizer for a mechanical transmission system that selectively decreases input shaft speed during upshifts, or increases input shaft speed during downshifts.

This and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
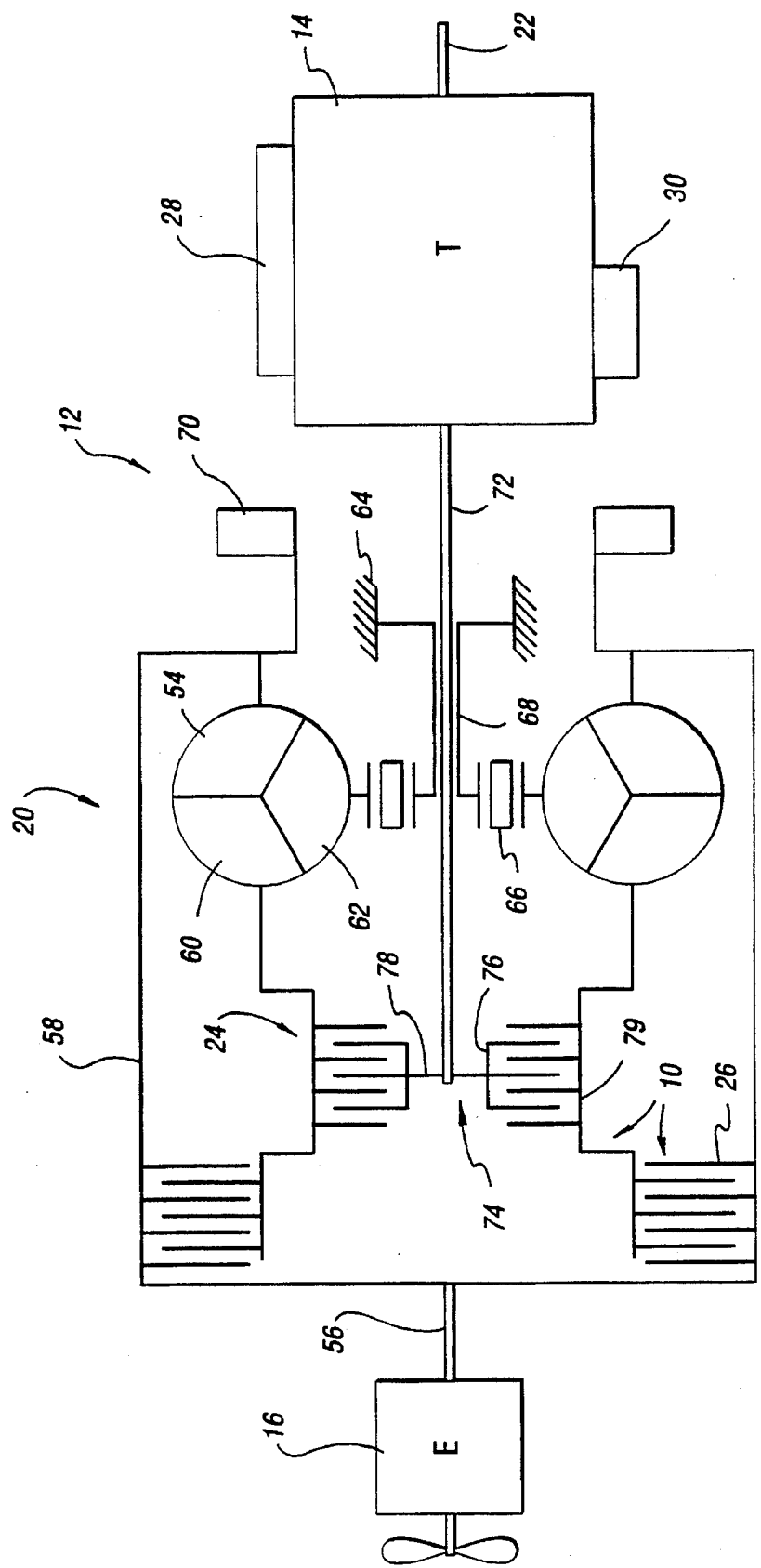
FIG. 1 is a schematic view of a torque converter and torque converter disconnect and bypass clutch structure according to the present invention.
Figure 2:
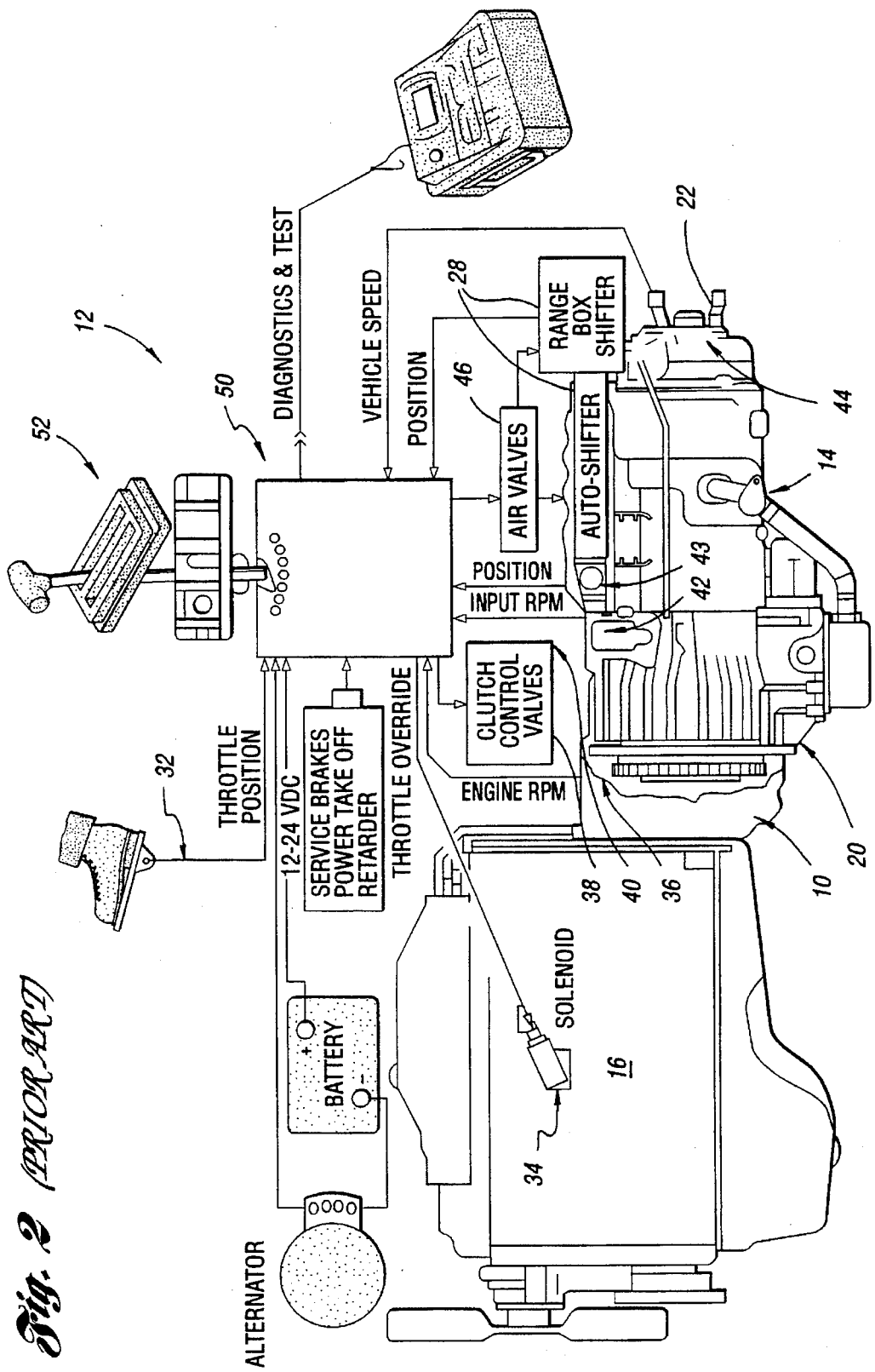
FIG. 2 is a descriptive illustration of an automatic mechanical transmission system according to the present invention.
Figure 3:
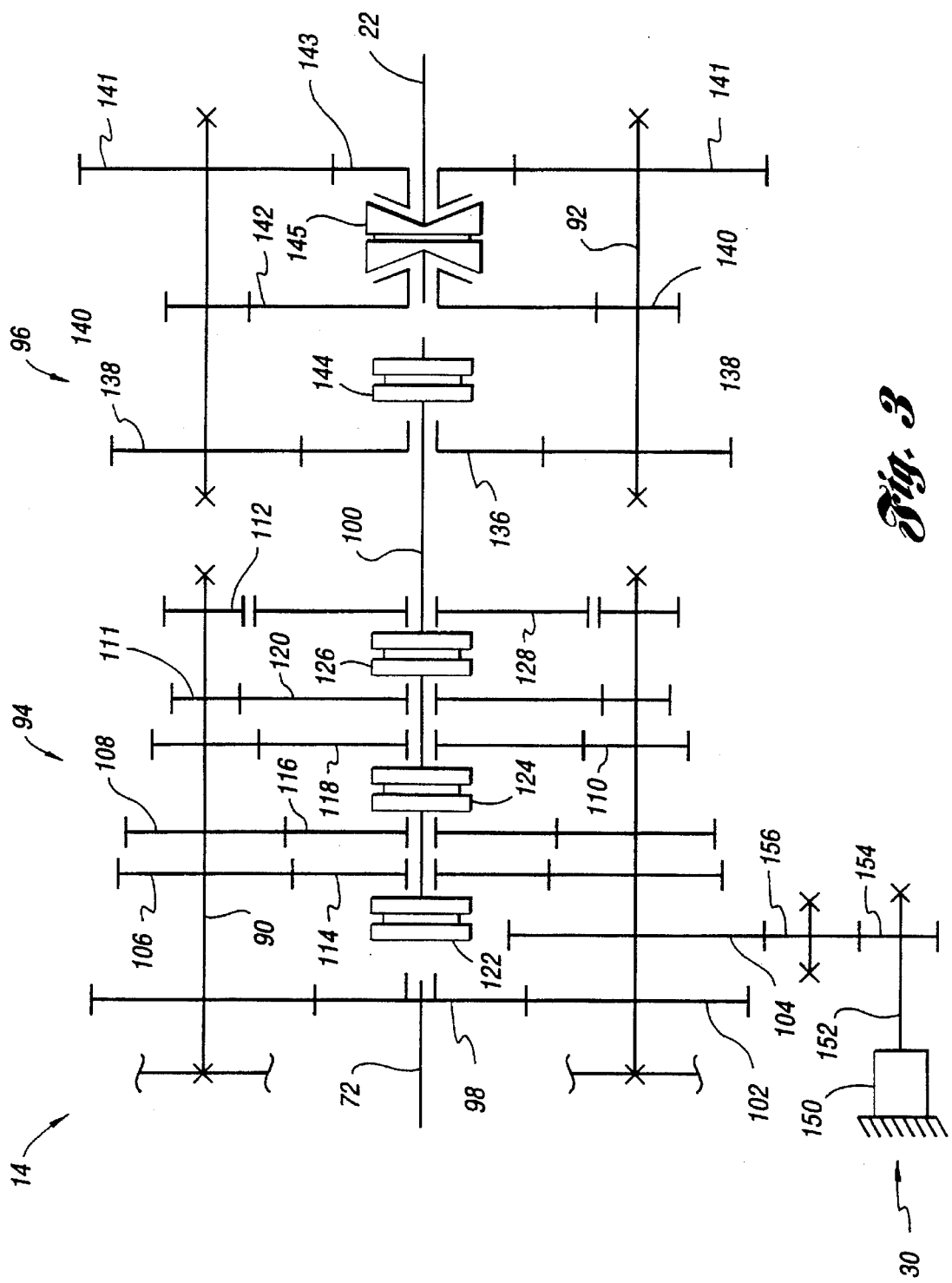
FIG. 3 is another schematic illustration of a main section and an auxiliary section of a transmission according to the present invention.

FIGS. 1 through 3 show a torque converter lock-up and disconnect clutch assembly 10 and an automatic mechanical transmission system 12 utilizing the assembly 10. The term "automatic mechanical transmission system" means a system comprising at least a throttle device controlled heat engine 16, a multi-speed jaw clutch type change gear transmission 14, a nonpositive coupling device such as a master friction clutch assembly 10 and/or a fluid coupling 20 interposed between the engine and the transmission and a control unit 50 for automatically controlling same. Such systems will, of course, also include sensors and/or actuators for sending input signals to and/or receiving command output signals from the control unit. While the present invention is well suited for use in connection with transmission systems having a torque converter and torque converter lock-up/disconnect clutch, the invention is also applicable to transmission systems having a standard friction master clutch drivingly interposed between the engine and the transmission. It would also be possible to control the engine speed with the master clutch engaged provided the power synchronizer motor has sufficient capacity.

The automatic mechanical transmission system 12 of the present invention is intended for use on a land vehicle, such as a heavy duty truck, but is not limited to such use. The output of the automatic transmission 14 is an output shaft 22 which is adapted for driving connection to an appropriate vehicle component such as the differential of a drive axle, a transfer case, or the like, as is well known in the prior art.

As will be discussed in greater detail below, the torque converter lock-up and disconnect clutch assembly 10 includes two separate, independently engageable clutches, preferably friction clutches, such as a torque converter disconnect clutch 24 and a torque converter lock-up or bypass clutch 26. The transmission 14 includes a transmission operating mechanism 28 which is preferably in the form of a pressurized fluid-actuated shifting assembly of the type disclosed in above-mentioned U.S. Pat. No. 4,445,393.

The above-mentioned power train components are acted upon and monitored by several devices, each of which are known in the prior art and will be discussed in greater detail below. These devices may include a throttle position monitor assembly 32, which senses the position of the operator controlled vehicle throttle pedal or other fuel throttling device, a throttle control 34 which controls the supply of fuel to the engine, an engine speed sensor assembly 36 which senses the rotational speed of the engine, a torque converter disconnect clutch and lock-up clutch operator 40 which operates the torque converter disconnect and lock-up clutches, a transmission input shaft speed sensor 42, a transmission output shaft speed sensor 44, and/or a transmission shifting mechanism operator 46 for controlling the operation of transmission shifting mechanism 28. The throttle control 34 may simply be an override device to reduce ("dip") fuel to the engine to a set, or variable level, regardless of the operator's positioning of the throttle pedal. Alternatively, the control 34 may be an electronic fuel/engine control conforming to SAE J1922, SAE J1939 or a similar standard.

The above-mentioned devices supply information to and/or accept commands from the electronic control unit (ECU) 50. The ECU 50 is preferably based on a digital microprocessor, the specific configuration and structure of which form no part of the present invention. The central processing unit 50 also receives information from a shift control or mode selector assembly 52 by which the operator may select a reverse (R), a neutral (N) or several forward drive (D,$D_L$) modes of operation of the vehicle. Typically, the D mode of operation is for on-highway vehicle travel while the $D_L$ mode of operation is for off-road operation.

Typically, the system also includes various sensors, circuits and/or logic routines for sensing and reacting to sensor and/or actuator failures. As is known, ECU 50 receives inputs from the various sensors and/or operating devices. In addition to these direct inputs, ECU 50 may be provided with circuitry and/or logic for differentiating the input signals to provide calculated signals indicative of the rate of change of the various monitored devices, means to compare the input signals, and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. Nos. 4,361,060 and 4,595,986 and/or by reference to a technical paper entitled "The Automation Of Mechanical Transmissions," published proceedings of a joint IEEE/SAE conference entitled "International Congress 20 on Transportation Electronics", IEEE Catalog Number 84CH1988-5, the disclosure of which is hereby incorporated by reference in its entirety.

Preferably, the system 12 will also include logic routines and sensors for sensing the "touch point" or incipient engagement, of clutch 24, or of a master friction clutch. See, for example, U.S. Pat. Nos. 4,899,838; 4,853,629; and 4,646,891, the disclosures of which are hereby incorporated by reference in their entirety. As is well known in the operation/function of electronic control units, especially microprocessor based ECUs, the various logic functions can be performed by discrete hardwired logic units or by a single logic unit operating under different portions or subroutines of the control system logic rules (i.e. the software).

FIG. 1 shows a detailed schematic illustration of the torque converter 20 and torque converter lock-up and disconnect clutch assembly 10 drivingly interposed between engine 16 and change gear transmission 14. The torque converter assembly 20 is conventional in that it includes a fluid coupling of the torque converter type having an impeller 54 driven by the engine output or crank shaft 56 through a shroud 58, a turbine 60 hydraulically driven by the impeller, and a stator or runner 62 which becomes grounded to a housing 64 via a one-way roller clutch 66 carried by a shaft 68 ground to the housing 64. Shroud 58 also drives a pump 70 for pressurizing the torque converter, lubricating the transmission, selectively pressuring the transmission shifting mechanism 28 and/or operating the disconnect and bypass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of the torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking-up the torque converter 20 and driving transmission 14 directly from the engine 16 if disconnect clutch 24 is engaged. Additionally, at speeds above torque converter lock-up speed, the lock-up clutch 26 need not be engaged and disengaged during shifting as disengagement of clutch 24 disconnects the inertia of connection member 79 from input shaft 72.

If the torque converter bypass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial effects of the engine, clutch 26 and/or torque converter allows the rotational speed of the input shaft 72, and all transmission gearing drivingly connected thereto, to be accelerated or decelerated by a transmission power synchronizer mechanism 30 according to the present invention (discussed below) in a more rapid manner for purposes of more rapidly achieving synchronization during a downshift or upshift of the transmission while also allowing the power synchronizer 30 to cause the input shaft 72 to rotate at a rotational speed greater than any governed engine speed.

When the vehicle is at rest with the mode selector in the drive or off-highway drive mode, the disconnect clutch 24 will be engaged and the lock-up clutch 26 disengaged allowing for torque converter start-up with its well known advantages. Above a given vehicle speed and/or gear ratio, the advantages of torque converter operation are no longer required, and the increased efficiency of a direct drive between the drive engine and transmission is required. Upon these conditions, the torque converter lock-up clutch 26 will be maintained engaged allowing the transmission input shaft 72 to be driven directly from the engine via the torque converter shroud 58 and connecting member 79 when the disconnect clutch 24 is engaged.

As discussed above, clutch 24 will be disengaged to shift from a previously engaged gear to neutral, to allow the power synchronizer 30 to synchronize the jaw clutch members of the gear to be engaged and to allow engagement of the synchronized jaw clutches of the gear to be engaged. Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. Nos. 4,361,060 and 4,595,986.

FIG. 3 shows the compound transmission 14 having one or more main section countershafts 90 and one or more auxiliary section countershafts 92. Transmission 14 is of a relatively standard design and is preferably of the twin countershaft type as shown. Examples of such transmission having coaxially aligned main section and auxiliary section countershafts may be seen by reference to U.S. Pat. Nos. 3,105,395 and 3,138,965, the disclosures of which are hereby incorporated by reference in their entirety.

Transmission 14 includes input shaft 72 to which member 78 is fixed for rotation therewith and which additionally carries input gear 98 nonrotatably attached thereto. Each main section countershaft 90 is substantially parallel to mainshaft 100 and is provided with countershaft gears 102, 104, 106, 108, 110, 111 and 112 fixed for rotation therewith. A plurality of mainshaft gears, also called ratio gears, 114, 116, 118 and 120, surround the mainshaft and are selectively clutchable thereto, one at a time, by double-sided positive jaw clutch collars 122, 124 and 126. Jaw clutch collar 122 may also clutch the input shaft 72 directly to the mainshaft 100 while clutch collar 126 may clutch reverse mainshaft gear 128 to the mainshaft.

The mainshaft gears 114, 116, 118 and 120 surround the mainshaft and are in continuous meshing engagement with, and are preferably supported by, opposed pairs of countershaft gears 106, 108, 110 and 111 having mounting means with special advantages resulting therefrom as explained in greater detail in U.S. Pat. Nos. 3,105,395 and 3,335,616. Reverse mainshaft gear 128 is in continuous meshing engagement with countershaft gears 112 by means of conventional intermediate idler gears (not shown). The forwardmost countershaft gears 102 are continuously meshed with and driven by input gear 98 for causing rotation of countershafts 90 whenever the input gear is rotatably driven.

As is known in the prior art, each of the clutch collars are preferably directly or indirectly splined to the mainshaft for rotation therewith and axial movement relative thereto. Other mounting means for the clutch collars are known in the prior art and are intended to be included within the scope of the present invention. Each of the clutch collars 122, 124, and 126 is provided with means for receiving a shift fork or shift yoke (not shown) whereby the clutch collars are axially moved, one at a time, from the positions illustrated in FIG. 3 by the actuator 28.

The auxiliary transmission section 96 includes output shaft 22 which is preferably coaxial with input shaft 72 and mainshaft 100 and is supported for rotation in a transmission housing by means of bearings. The auxiliary section also includes one or more auxiliary section countershafts 92 supported for rotation in the housing by means of bearings. The auxiliary section drive gear 136 is rotatably mounted on the mainshaft 100. Auxiliary section countershafts 92 carry auxiliary section countershaft gears 138, 140 and 141 fixed for rotation therewith. Auxiliary section countershaft gears 138 are constantly meshed with auxiliary section input gear 136 while auxiliary section countershaft gears 140 and 141 are constantly meshed with gears 142 and 143, respectively, which surround the output shaft 22. A splitter clutch 144 is utilized to selectively clutch mainshaft 100 and auxiliary drive gear 136 or gear 142, as is well known in the prior art. A synchronized clutch structure 145, of conventional individually synchronized jaw clutch design, is controlled by a shift fork (not shown) axially moved by actuator 28 to engage either gear 142 or gear 143 to output shaft 22.

Transmission 14 is of the combined splitter and range type wherein the auxiliary section ratio step (or steps) provided by the range clutch 145 is greater than the total ratio coverage of the main section ratios. Such transmissions are well known in the prior art as evidenced by, e.g. U.S. Pat. No. 4,754,665, the disclosure of which is hereby incorporated by reference in its entirety.

The power synchronizer 30 comprises a variable speed motor 150 having a motor shaft 152. The motor shaft is operably engaged with the input shaft 72, preferably through the input gear 98, one of the countershaft gears such as PTO gear 104, a gear 154 rotatably fixed to the motor shaft, and an intermediate gear 156 that constantly meshes with both the gear 154 and the countershaft gear 104. In this embodiment, the housing of the motor 150 is grounded and the motor shaft 152 is groundable to the housing so that the speed of the motor is variable by the ECU 50 between zero and a maximum speed. For a particular motor chosen for its size, durability and power, this maximum speed will vary. For instance, a suitable motor may produce its maximum power at about 5000 rpm. Because the speed and durability requirements are relatively high, a brushless electric motor is preferable. Alternatively, motor 150 may be hydraulically or pneumatically operated. To function optimally with the countershaft 90, which normally has a maximum speed of about 1500 rpm, the gears 154 and 104 should therefore effect a ratio of about 1:3.33.

The shift sequence for a simple shift of transmission 14 in system 12 will now be described. Assuming the ECU 50 determines that a main section shift from second (2nd) to third (3rd) speed is required (i.e. a simple upshift), the ECU will cause fuel controller 34 to defuel (i.e. "dip") the engine regardless of the position of the throttle pedal. While the engine is being defueled, the disconnect clutch (or master clutch) 24 is disengaged and a shift to main section 94 neutral is effected.

Upon defueling the engine, declurching the disconnect clutch and disengaging the main section, the power synchronizer is actuated to cause the target mainshaft gear (in this example 3rd speed mainshaft gear 116) to rotate at a target or substantially synchronous speed relative to mainshaft 100. The target mainshaft speed can either be estimated using the known step between gear ratios, or determined by the ratio of output shaft speed and auxiliary section 96. Output shaft speed can be sensed by sensor 44 while the speed of the various mainshaft gears is a known multiple of input shaft 72 speed. The input shaft speed can be determined from the speed of the motor shaft 152, or sensed by sensor 42.

The rail select function can occur at any time after main section disengagement. Main section reengagement of the new ratio is timed to occur as the power synchronizer is bringing the engaged gear towards target speed. In practice, for the type of jaw clutches utilized in heavy duty mechanical transmission 12, a positive clutch is considered substantially synchronized if the members thereof have no greater than a one hundred fifty (150) rpm difference therebetween. Of course, for an upshift, the power synchronizer 30 is normally required to retard the speed of the input shaft and associated gearing. This is accomplished by having the motor 150 generate a negative torque, for example by applying a negative voltage to a DC electric motor. Upon achieving engagement of the proper main section ratio, the disconnect clutch is reengaged and the engine refueled. Typically, a simple shift can be accomplished in about 0.70 to 0.80 seconds with a disconnect (i.e. torque break) time of about 0.50 seconds.

As an example of a simple downshift, assume an initial input shaft speed of 1500 rpm must be increased to 2200 rpm to achieve synchronous. With a motor 150 capable of 5000 rpm, the input shaft speed can easily be driven at least as high as the target speed, assuming that the ratio of the number of teeth on the motor shaft gear 154 times the number of teeth on the gear 102, divided by the quantity of the number of teeth on the gear 104 times the number of teeth on the input gear 98, is equal to or greater than about 1:2.27 (2200/5000).

Figure 4:
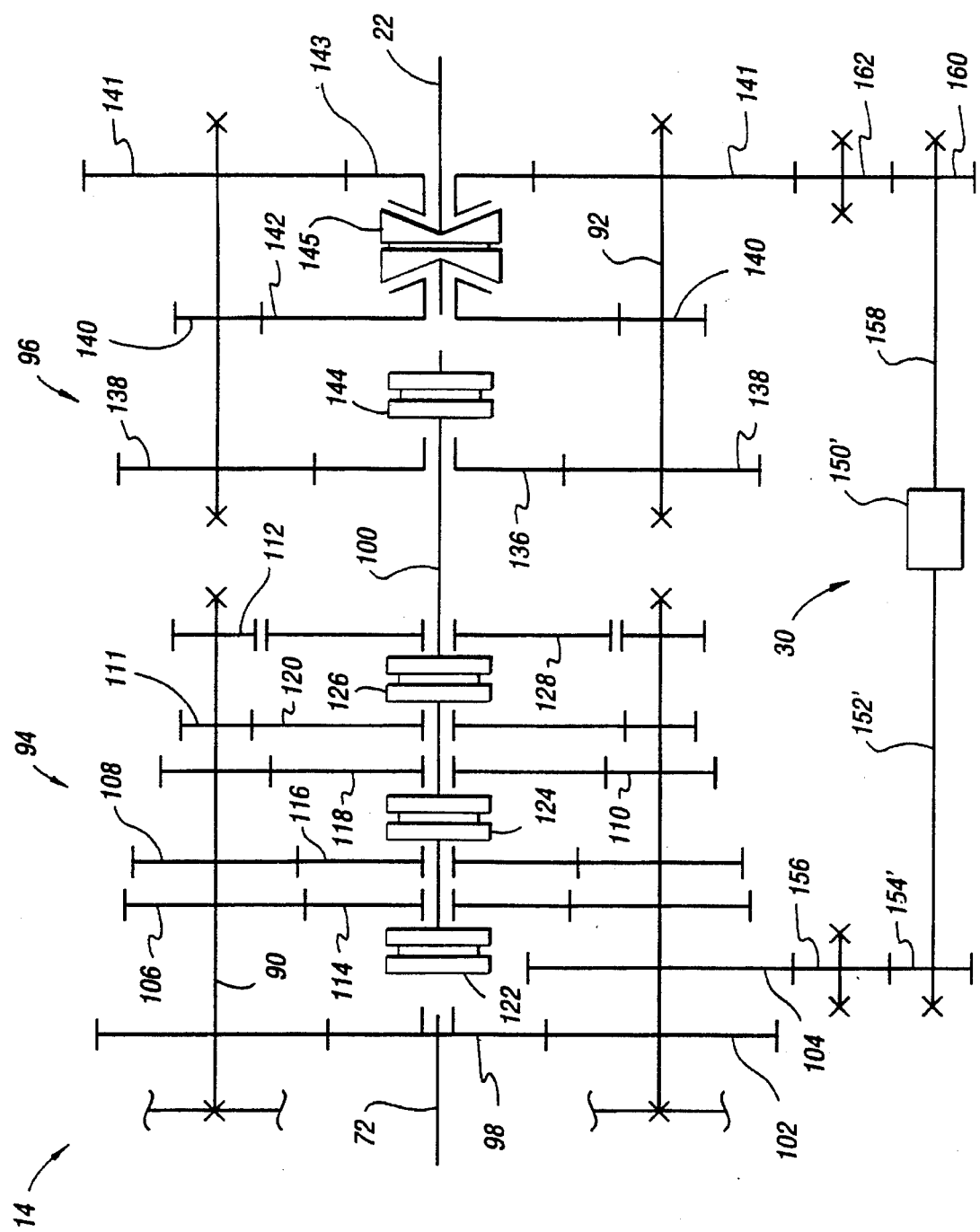
FIG. 4 is a view similar to FIG. 3 showing an alternative embodiment of the present invention.

FIG. 4 shows an alternative embodiment of the compound transmission in which a variable speed motor 150' is connected between the input shaft 72 and the output shaft 22. On one end of the motor shaft 152', gear 154' is operably engaged with the input gear 98 as with the embodiment shown in FIG. 3, while another shaft 158 connected to the motor housing has a gear 160 operably engaged with an auxiliary section gear, such as gear 143 mounted on the output shaft, via gears 162 and 141. Depending on the position of synchronized clutch structure 145, output shaft 22 is either directly coupled to gear 143, or indirectly coupled to gear 143 through gears 142, 140, and 141. Depending on the available space, gear 160 can be engaged with the auxiliary section gear 143 through one or more intermediate gears, such as gear 162. In this embodiment, the speed of the motor 150' is thus variable between the speed of the input shaft 72 and the speed of the output shaft 22, and upshifts and downshifts are handled as described above with respect to FIG. 3. It should be understood, of course, that gear 160 can alternately be operably engaged with a gear permanently fixed to output shaft 22, or to mainshaft 100, such as when there is no auxiliary section in the transmission.

Although the present invention has been described with a certain degree of particularity, it is understood that various components thereof may be substituted for and/or rearranged without departing from the spirit and the scope of the present invention as hereinafter claimed.

What is claimed is:

1. An apparatus for controlling rotational speed of an input shaft of a mechanical change gear transmission, the transmission including a mainshaft having a plurality of ratio gears selectively engageable thereto and at least one countershaft having at least one countershaft gear fixed for rotation therewith, the apparatus comprising:

a variable speed motor having a motor shaft a motor gear rotatably fixed to the motor shaft; and an intermediate gear in constant meshing engagement with the at least one countershaft gear and the motor gear, wherein the variable speed motor is operated to selectively alter rotational speed of the input shaft.

2. The apparatus of claim 1 wherein the motor gear and the at least one countershaft gear are coupled through the intermediate gear to effect a ratio of countershaft gear speed to motor gear speed of about 1:3.33.

3. The apparatus of claim 2 wherein speed of the motor is variable between zero and a predetermined maximum value.

4. The apparatus of claim 2 wherein the motor comprises an electric motor.

5. The apparatus of claim 4 wherein the motor comprises a brushless electric motor.

6. The apparatus of claim 1 wherein the motor comprises a hydraulic motor.

7. The apparatus of claim 1 wherein the motor comprises a pneumatic motor.

8. The apparatus of claim 1 wherein the transmission comprises a compound transmission having a main section and an auxiliary section.

9. An apparatus for controlling rotational speed of an input shaft of a motor vehicle transmission, the transmission including a mainshaft having a plurality of ratio gears selectively engageable thereto and at least one countershaft operable to couple the input shaft to an output shaft, the apparatus comprising:

a variable speed motor operably engaged with the input shaft and with the output shaft to selectively increase or decrease rotational speed of the input shaft relative to rotational speed of the output shaft.

10. The apparatus of claim 9 further comprising an input gear mounted on the input shaft, and a countershaft gear mounted on the at least one countershaft and engaged with the input gear, the motor having a motor shaft operably engaged with the countershaft gear.

11. The apparatus of claim 10 wherein the motor shaft is operably engaged with the countershaft gear through a first intermediate gear.

12. The apparatus of claim 9 further comprising an output gear mounted on the output shaft, the motor being operably engaged with the output gear.

13. The apparatus of claim 12 wherein the motor is operably engaged with the output gear through a second intermediate gear.

14. The apparatus of claim 9 wherein the motor comprises an electric motor.

15. The apparatus of claim 14 wherein the motor comprises a brushless electric motor.

16. The apparatus of claim 9 wherein the motor comprises a hydraulic motor.

17. The apparatus of claim 9 wherein the motor comprises a pneumatic motor.

18. A compound transmission including a main section connected in series with an auxiliary section, the transmission comprising:

an input shaft having an input gear mounted thereon;

a mainshaft having a plurality of ratio gears selectively engageable thereto;

at least one main countershaft having a main countershaft gear mounted thereon and engaged with the input gear;

a power synchronizer gear mounted on the at least one main countershaft;

an auxiliary section including at least one auxiliary countershaft, selectively coupleable to the mainshaft, and at least one auxiliary countershaft gear;

a variable speed electric motor having first and second motor shafts;

first and second motor gears mounted on the first and second motor shafts, respectively;

a first intermediate gear in constant meshing engagement with the first motor gear and the power synchronizer gear; and a second intermediate gear in constant meshing engagement with the second motor gear and the at least one auxiliary countershaft gear wherein the variable speed electric motor is operable to selectively alter the rotational speed of the input shaft relative to the output shaft to effect synchronous during a ratio change.

\* \* \* \* \*